Patented Aug. 1, 1950

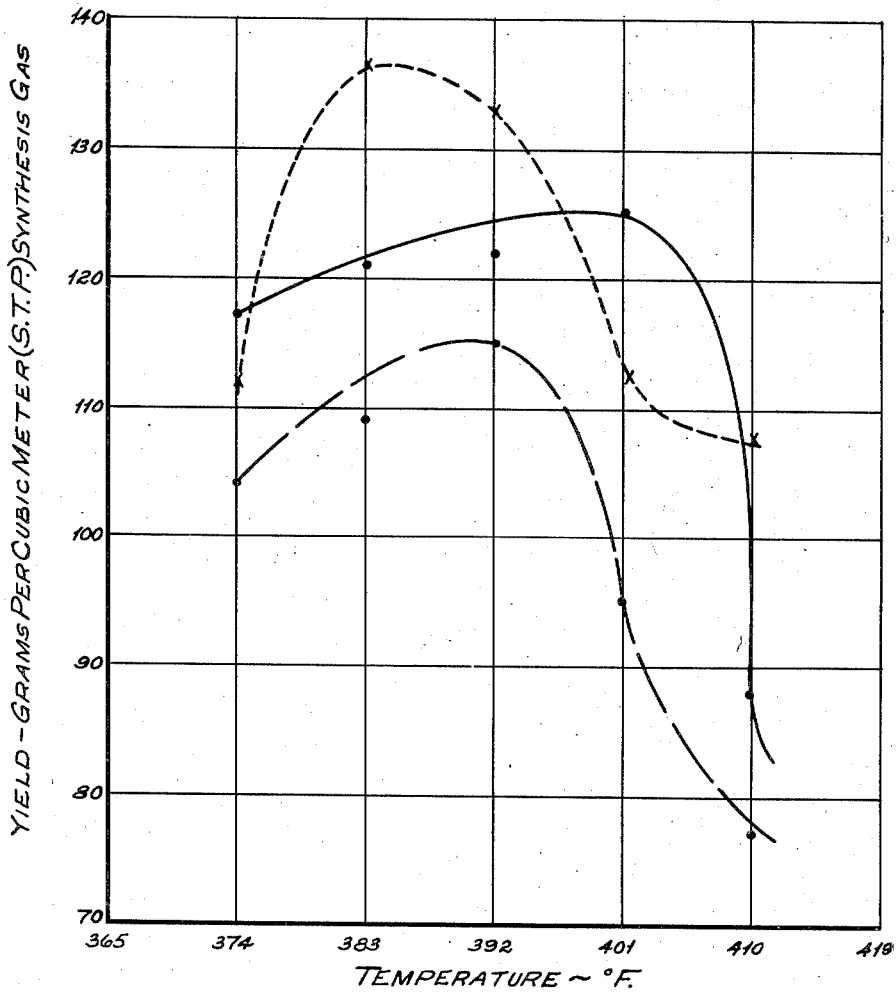

2,517,036

UNITED STATES PATENT OFFICE 2,517,036

SUPPORTED CATALYSTS FOR THE CONVERSION OF CARBON-MONOXIDE-CONTAINING REACTANTS

Eugene E. Sensel, Beacon, N. Y., and Meredith M. Stewart, Somerville, N. J., assignors to The Texas Company, New York, N. Y., a corporation of Delaware Application June 11, 1947, Serial No. 754,026

3 Claims. (Cl. 260—449.6)

This invention relates to novel synthesis catalysts for use in connection with the catalytic conversion of carbon monoxide-containing reactants.

The invention contemplates an improved synthesis catalyst comprising a metal of the iron group and a supporting material which comprises in part silica-stabilized alumina. In accordance with this invention, an effective catalyst for the conversion of carbon monoxide-containing reactants is one in which a metal of the iron group is supported on a supporting material comprising both silica-stabilized alumina and uncalcined diatomaceous earth, advantageously in about equal proportions by weight.

The novel catalyst of the subject invention has particular application in effecting the conversion of synthesis gas containing carbon monoxide and hydrogen into hydrocarbons, oxygen-containing compounds and the like.

Activated alumina containing about 5 weight per cent silica and less than about 0.8 per cent alkali, expressed as per cent by weight of sodium oxide, is effective as the stabilized alumina constituent of the catalyst; advantageously the silica-stabilized alumina contains less than 0.2 per cent alkali. It is also contemplated that various naturally occurring or synthetic absorptive materials, other than uncalcined diatomaceous earth, may be employed in conjunction with silica-stabilized alumina as a supporting agent for the catalyst metal.

In addition to a metal of the iron group and a supporting material comprising in part, silica-stabilized alumina, the catalyst may contain conventional promoters, such as magnesia, thoria, vanadia, manganese oxide, chromia, molybdena, etc.

While a cobalt synthesis catalyst supported on a mixture comprising silica-stabilized alumina and uncalcined diatomaceous earth is particularly active, nevertheless, it is contemplated that other metals of the iron group, such as iron and nickel, be employed in conjunction with a supporting agent comprising silica-stabilized alumina and diatomaceous earth.

As will be apparent from the accompanying drawing, a supported cobalt catalyst in which the supporting material comprises about equal proportions by weight of silica-stabilized alumina and uncalcined diatomaceous earth is more effective in synthesizing liquid hydrocarbons from carbon monoxide and hydrogen than cobalt catalysts in which the supporting material consists either of uncalcined diatomaceous earth alone or silica-stabilized alumina alone.

The drawing comprises a graph showing the relationship between yields of liquid hydrocarbons in grams per cubic meter of charge gas and synthesis reaction temperatures for three different catalysts: 1, a standard cobalt catalyst comprising 32 weight per cent cobalt, 3 weight per cent magnesia, 1 weight per cent thoria and supported on 64 weight per cent diatomaceous earth; 2, a standard cobalt catalyst comprising 32 weight per cent cobalt, 3 weight per cent magnesia, 1 weight per cent thoria and supported on a mixture consisting of 32 weight per cent diatomaceous earth and 32 weight per cent silica-stabilized alumina; 3, a standard cobalt catalyst comprising 32 weight per cent cobalt, 3 weight per cent magnesia, 1 weight per cent thoria and supported on 64 weight per cent silica-stabilized alumina.

In the case of each catalyst, synthesis gas consisting of about one volume of carbon monoxide and two volumes of hydrogen, is passed through a stationary mass of the catalyst in solid particle form at a space velocity of about 100 volumes of feed gas measured at standard conditions of temperature and pressure per hour per volume of catalyst. Each catalyst was evaluated at five different temperature levels over the range of 374° to 410° F., namely 374°, 383°, 392°, 401° and 410°; samples of the reaction products were obtained at each temperature level and were analyzed to determine the yield of $C_5$ and higher molecular weight hydrocarbons. The yields of $C_5+$ hydrocarbons in grams per cubic meter of synthesis gas measured at standard conditions of temperature and pressure (S. T. P.) so obtained are plotted as ordinates in the accompanying drawing, while the reaction temperatures in degrees F. are plotted as abscissae.

From the graph, it is apparent that a cobalt catalyst supported on a 50-50 mixture by weight of uncalcined diatomaceous earth and silica-stablized alumina is substantially more active in the production of liquid hydrocarbons than are cobalt catalysts supported on uncalcined diatomaceous earth alone or on silica-stabilized alumina alone. The cobalt catalyst supported on the mixture of silica-stabilized alumina and uncalcined diatomaceous earth is approximately 16 per cent more active at 383° F. than a cobalt catalyst supported on uncalcined diatomaceous earth alone and is approximately 29 per cent more active at the same temperature than a cobalt catalyst supported on silica-stabilized alumina alone.

In order to demonstrate the mode of preparation of a novel catalyst of this invention, a detailed description of the preparation of a cobalt catalyst supported on a mixture of silica-stabilized alumina and uncalcined diatomaceous earth is presented in the following example.

Example

Ingredients were added to this catalyst in order to form a catalyst containing 32 parts of cobalt, 3 parts of magnesia, 1 part of thoria, 32 parts of silica-stabilized alumina and 32 parts of uncalcined diatomaceous earth, all proportions expressed as parts by weight. To this end, 948 grams of $Co(NO_3)_2 \cdot 6H_2O$, 114.5 grams of $Mg(NO_3)_2 \cdot 6H_2O$ and 12.5 grams of $Th(NO_3)_4 \cdot 4H_2O$ were dissolved in five liters of water; thereafter 204 grams of uncalcined diatomaceous earth and 213 grams of silica-stabilized alumina containing approximately 5% silica by weight were added to the solution. After stirring the mixture for one half hour, the metals were completely precipitated with a solution of 10 weight per cent sodium carbonate. The precipitate was filtered and was thereafter washed ten times by slurrying with five liters of water at each washing until the sodium oxide content of a small separate sample dried for three hours at 1000° F. was below 0.05% by weight. Thereafter the filter cake was broken into ½" lumps and dried at 250° F. to a water content of about 20% by weight. The material was then ground to 40 mesh size and pelleted in $\frac{3}{32}$" dies. This catalyst was then reduced with a stream of pure hydrogen at 660° F. for a period of 24 hours employing a hydrogen space velocity, calculated at 60° F. and 0 p. s. i. g. of about 100. Thereafter the catalyst was conditioned by passing synthesis gas, containing one part by volume of carbon monoxide and two parts by volume of hydrogen, through it for eight hours at a space velocity of 100 while the temperature of the reactor was raised uniformly from 300 to 374° F., at which latter temperature the evaluation experiments were started. When this catalyst comprising approximately 32 weight per cent cobalt, 3 weight per cent magnesia, 1 weight per cent thoria, 32 weight per cent silica-stabilized alumina and 32 weight per cent uncalcined diatomaceous earth was employed for the catalytic conversion of synthesis gas containing hydrogen and carbon monoxide in the molecular ratio of 2:1 at 383° F., atmospheric pressure, and a space velocity of 100, 137 grams of $C_5+$ liquid hydrocarbons per cubic meter of synthesis gas were obtained; this is equivalent to about a 64 per cent theoretical conversion to hydrocarbons.

Two other catalysts, whose activities are represented in the accompanying drawing, namely a magnesia+thoria-promoted cobalt catalyst supported on uncalcined diatomaceous earth alone and a magnesia+thoria-promoted catalyst supported on silica-stabilized alumina alone, were prepared in exactly the same manner as was the catalyst described in the foregoing example, and were similarly evaluated. In these latter two catalysts, uncalcined diatomaceous earth and silica-stabilized alumina were used individually as sole supporting materials rather than a dual support, as in the catalyst first described in this example.

While mention has been made of employing fixed bed catalyst technique, it is contemplated that the catalyst of this invention is active in a fluid catalyst type reactor, such as a moving bed reactor or a fluidized fixed bed reactor for the conversion of carbon monoxide-containing reactants.

The examples in the description of the invention have illustrated the usefulness of a silica-stabilized alumina as a component of the supporting material in a cobalt catalyst employed for the conversion of synthesis gas comprising carbon monoxide and hydrogen into a product comprising mainly liquid hydrocarbons. It is also contemplated that catalysts comprising a metal of the iron group supported on a material comprising in part silica-stabilized alumina are highly active for the reaction of carbon monoxide with olefins and other unsaturated compounds to produce oxygen-containing compounds such as alcohols, aldehydes, ketones, acids and the like. Cobalt catalysts which are supported on silica-stabilized alumina are particularly effective for the reaction of carbon monoxide with unsaturated compounds.

Obviously many modifications and variations of the invention, as hereinbefore set forth, may be made without departing from the spirit and scope thereof and, therefore, only such limitations should be imposed as are indicated in the appended claims.

We claim:

1. In a process for the synthesis of hydrocarbons and oxygenated hydrocarbons by the catalytic interaction of synthesis reactants comprising carbon monoxide and hydrogen in synthesis proportions, the improvement which comprises passing the synthesis reactants at a synthesis reaction temperature in the range of about 375 to 396° F. into contact with a catalyst comprising cobalt and a composite supporting material consisting essentially of approximately equal proportions by weight of uncalcined diatomaceous earth, and alumina containing less than about 0.8 percent by weight of alkali metal compounds, expressed on the basis of equivalent sodium oxide, stabilized with about 5 weight percent silica, said catalyst comprising a promotor for the synthesis reaction.

2. A process for the synthesis of hydrocarbons and oxygenated hydrocarbons which comprises contacting a synthesis gas comprising carbon monoxide and hydrogen in synthesis proportions at a temperature within the range of about 375 to 396° F. with a catalyst comprising cobalt including the promotors magnesia and thoria and supported on a composite supporting material consisting essentially of a mixture of approximately equal proportions of uncalcined diatomaceous earth, and alumina containing less than about 0.8 percent by weight of alkali metal compounds expressed on the basis of equivalent sodium oxide and stabilized with about 5 percent by weight of silica.

3. The process according to claim 2 wherein the catalyst comprises about 32 weight percent cobalt, 3 weight percent magnesia, 1 weight percent thoria, 32 weight percent uncalcined diatomaceous earth and 32 weight percent alumina stabilized with about 5 percent by weight of silica.

EUGENE E. SENSEL.
MEREDITH M. STEWART.

REFERENCES CITED

The following references are of record in the file of this patent:

UNITED STATES PATENTS

| Number | Name | Date |
|---|---|---|
| 1,201,850 | Mittasch et al. | Oct. 17, 1916 |
| 1,299,641 | Weintraub | Apr. 8, 1919 |
| 2,365,029 | Voorhies, Jr. | Dec. 12, 1944 |
| 2,406,864 | Thomas | Sept. 3, 1946 |
| 2,417,164 | Huber, Jr. | Mar. 11, 1947 |